United States Patent
Weik, III et al.

(10) Patent No.: US 9,521,148 B2
(45) Date of Patent: Dec. 13, 2016

(54) ONLINE PORTAL ACCESS AND MANAGEMENT SYSTEM UTILIZING MULTIPLE IP DEVICES ORGANIZED ON A SERVER APPLICATION WITH MULTIPLE LEVEL RESTRICTED LOG-IN AND EVENT LOGGING

(71) Applicants: Martin H. Weik, III, Stanardsville, VA (US); Arthur Steven Weik, Fairfax, VA (US); Gary A. Altenberg, Buffalo, MN (US); James Ternus, Rogers, MN (US); David Fields, Alexandria, VA (US)

(72) Inventors: Martin H. Weik, III, Stanardsville, VA (US); Arthur Steven Weik, Fairfax, VA (US); Gary A. Altenberg, Buffalo, MN (US); James Ternus, Rogers, MN (US); David Fields, Alexandria, VA (US)

(*) Notice: Subject to any disclaimer, the term of this patent is extended or adjusted under 35 U.S.C. 154(b) by 281 days.

(21) Appl. No.: 14/473,050

(22) Filed: Aug. 29, 2014

(65) Prior Publication Data

US 2015/0081736 A1    Mar. 19, 2015

Related U.S. Application Data

(63) Continuation-in-part of application No. 13/134,698, filed on Jun. 14, 2011, now Pat. No. 8,825,535, and a
(Continued)

(51) Int. Cl.
*H04L 29/06* (2006.01)
*G06F 17/30* (2006.01)
(Continued)

(52) U.S. Cl.
CPC ............. *H04L 63/101* (2013.01); *B60R 25/00* (2013.01); *B60R 25/102* (2013.01);
(Continued)

(58) Field of Classification Search
CPC ............ G06F 17/30289; G06F 21/6218; G06F 21/6227; B60R 25/102; B60R 25/305; H04L 63/101
See application file for complete search history.

(56) References Cited

U.S. PATENT DOCUMENTS 6,363,488 B1 * 3/2002 Ginter .................... G06F 21/10
                                                             348/E5.006
7,496,652 B2 * 2/2009 Pezzutti ................ H04L 41/065
                                                             709/217

(Continued)

*Primary Examiner* — Mussa A Shaawat
(74) *Attorney, Agent, or Firm* — Michael J. Foycik, Jr.

(57) ABSTRACT

An on-line portal access and management system uses multiple ip devices organized on a server application with multiple level restricted log-in and event logging. The program with multiple connected IP devices allows the credentialed user to access and organize the capabilities of the multiple system connected IP devices through a single login portal. The IP devices operate equipment such as doors, gates, cameras, access control systems, VOIP intercoms, HVAC systems and other IP based systems typically found in multi-story buildings or multi building campuses. The IP devices generate data logged and archived to the IP device memory media or local data storage device. The application program sifts the IP device generated data for user important information and moves important IP device generated information to the server based memory and data files.

15 Claims, 5 Drawing Sheets

Related U.S. Application Data continuation-in-part of application No. 13/598,142, filed on Aug. 29, 2012, now Pat. No. 8,831,970.

(51) Int. Cl.

| | |
|---|---|
| *B60R 25/00* | (2013.01) |
| *B60R 25/10* | (2013.01) |
| *B60R 25/102* | (2013.01) |
| *B60R 25/30* | (2013.01) |
| *G06Q 10/08* | (2012.01) |
| *G06Q 30/06* | (2012.01) |
| *G08G 1/14* | (2006.01) |
| *G07B 15/02* | (2011.01) |
| *G06F 21/62* | (2013.01) |
| *G07C 9/00* | (2006.01) |

(52) U.S. Cl.
CPC ........ *B60R 25/1012* (2013.01); *B60R 25/305* (2013.01); *G06F 17/30386* (2013.01); *G06Q 10/087* (2013.01); *G06Q 30/0645* (2013.01); *G07B 15/02* (2013.01); *G08G 1/14* (2013.01); *B60R 2325/205* (2013.01); *B60R 2325/304* (2013.01); *G06F 17/30289* (2013.01); *G06F 21/6227* (2013.01); *G07C 9/00126* (2013.01)

(56) References Cited

U.S. PATENT DOCUMENTS

| | | | | |
|---|---|---|---|---|
| 2004/0233036 | A1* | 11/2004 | Sefton | G07B 15/04 340/5.53 |
| 2006/0259933 | A1* | 11/2006 | Fishel | G08B 13/19647 725/105 |
| 2007/0069921 | A1* | 3/2007 | Sefton | G08G 1/0175 340/932.2 |
| 2013/0275164 | A1* | 10/2013 | Gruber | G10L 17/22 705/5 |
| 2014/0082142 | A1* | 3/2014 | Geffin | G06F 13/385 709/217 |

\* cited by examiner

ONLINE PORTAL ACCESS AND MANAGEMENT SYSTEM UTILIZING MULTIPLE IP DEVICES ORGANIZED ON A SERVER APPLICATION WITH MULTIPLE LEVEL RESTRICTED LOG-IN AND EVENT LOGGING

CROSS REFERENCE TO RELATED APPLICATIONS

This application is a continuation-in-part of, and claims the priority of U.S. patent application Ser. No. 13/134,698 by inventor Martin Herman Weik, III, entitled "Management and control system for a designated functional space having at least one portal," filed on Jun. 14, 2011, now pending, which is expressly incorporated herein in its entirety by reference thereto. This application is also a continuation-in-part of, and claims the priority of U.S. patent application Ser. No. 13/598,142 by inventors Martin Herman Weik III et al., entitled "Virtual management system and parking management system," filed on Aug. 29, 2012, now pending, which is expressly incorporated herein in its entirety by reference thereto.

STATEMENT REGARDING FEDERALLY SPONSORED RESEARCH OR DEVELOPMENT

Not applicable.

FIELD OF THE INVENTION

The present invention relates to an on-line portal access and management system utilizing multiple IP devices organized on a server application with multiple level restricted log-in and event logging

BACKGROUND OF THE INVENTION

Recently, various IP intelligent devices such as IP cameras, VOIP intercoms, IP door/gate controllers, IP access control systems, internet enabled servers, DVR's, NVR's, PC's for image and data storage with their individual programs have come on the market each with their specialized application program. For instance: IP cameras by SE Black, Sony, Panasonic and others, VOIP intercoms by CyberData, Viking Electronics, and others, IP door/gate Controllers by SmartDoor Systems, Inc., all offer an IP capability typical to IP devices such as remote, password protected log-in, system use file generation and data base management, event logging, various configuration capabilities, and remote diagnostic capabilities. The multiplicity of the devices, each with their own log-ins, passwords, security levels, setups, configurations, access to databases, fault reporting, notifications and report access security level clearance by type, operational access clearance, maintenance access clearance have combined to limit the effectiveness of multiple IP devices and overloaded data transmission capabilities has created obstacles to system integration because of its cost and complexity. Add to this the operational requirements of managing multiple portals in a single building; multiple buildings for a single customer, entity or institution, and handling the requirements of multiple customers, or institutions and the complexities multiply. Additionally, the spread of the IP portal control devices among various trades, developers, manufacturers and software writers, all hinder the development of a unified and integrated system that is easy for the end user to utilize. This complexity slows the system response time such that operational personnel are limited to assembling data accumulated after the fact from the separate systems in an event investigation and have little chance to intervene in the event as it happens to effect an alternate outcome.

Therefore there is a need for a single integration platform including apparatus and methods that overcomes the deficiencies inherent in the separate and various IP devices that can manage the log-in, security level, setup, report generation and access to data, event definition, event capture, alerting appropriate personnel with event notification, fault diagnosis, system maintenance, handle event definition, generation and management, define, categorize and sort event data, manage maintenance, alert operators to system faults, and makes a commercially viable multiple facility portal management capability possible with real time intervention in system faults and anomalies possible by operating personnel.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a single integration platform including apparatus and methods that overcomes the deficiencies inherent in the separate and various IP devices that can manage the log-in, security level, setup, report generation and access to data, event definition, event capture, alerting appropriate personnel with event notification, fault diagnosis, system maintenance, handle event definition, generation and management, define, categorize and sort event data, manage maintenance, alert operators to system faults, and makes a commercially viable multiple facility portal management capability possible with real time intervention in system faults and anomalies possible by operating personnel.

The present invention comprises systems, apparatus and methods for generating system events, event monitoring, event logging, and reviewing events, suggesting action types to system operators based on events, logging action taken as events, defining exceptions and anomalies as named event types, generating reports of all events by type, by customer, by location, by event generator unit which are predefined in the software as signals from defined sources, signals of defined duration, signals generated by execution commands to output devices and their duration, and events generated by a determination of the software from some combination of signals, their duration and the signal trail outcome of executed commands. Importantly, this present invention captures signal data from various portal devices into a database or collection of data bases for subsequent analysis or upon the collected data meeting certain criteria generating alerts to system operators.

Advantageously, this allows system operators to respond to events in real time and keeps a record of both the events generated and the responses to assist in system design and operational management.

Other objects and advantages of the present invention will be more readily apparent from the following detailed description when read in conjunction with the accompanying drawings.

DETAILED DESCRIPTION OF THE INVENTION

Figure 1:
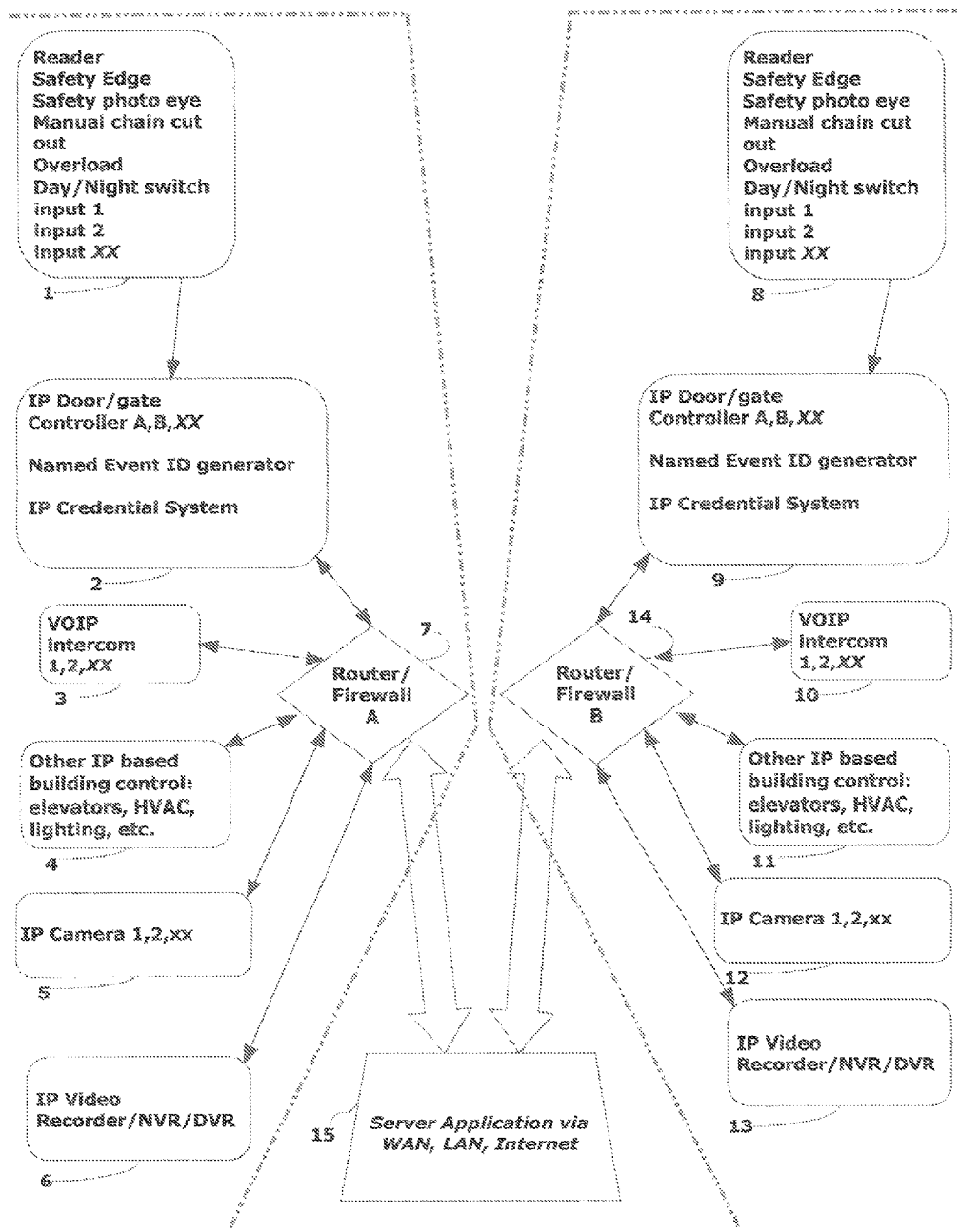
FIG. 1 schematically depicts a plurality of building operation IP devices typically found in modern buildings that are related to building operation systems, between two separate locations X and Y which are in communication via communications devices.

FIG. 1 schematically depicts a plurality of building operation IP devices typically found in modern buildings that are related to building operation systems, between two separate locations X and Y which are in communication via communications devices.

More specifically, FIG. 1 displays a plurality of building operation IP devices described further hereunder that are typically found in modern buildings that are related to building operation systems.

Element 1 in FIG. 1 depicts a system of signaling devices that typically serve to control a door/barrier/gate systems typically found in modern buildings with motorized door/gate/access equipment. These devices (and others that are familiar to any one having skill in this art) also serve as the basis for a named event generator/door controller 2 and 9 in FIG. 1. The named event generators 2, 9 have programs that can name events based on a combination of, and/or timing/duration of, the signals they receive from its various inputs 1, 8 respectively in FIG. 1.

FIG. 1 depicts a VOIP intercom/phone 3 that typically is associated with a door or gate to a building. Other building operations systems 4 are depicted that are commonly found in large buildings. FIG. 1 further depicts IP camera(s) 5, also typically found in large buildings, and are now even found in smaller buildings. A video Recorder/NVR/DVR 6 is shown, also typically found in buildings associated with their security cameras. A router/firewall 7 is provided in FIG. 1, which is of a type typically found with IP equipment. The router/firewall 7 is connected to a server application 15 via WAN, LAN or internet, for example, and can include other communications which would be known to any one having skill in this art. The router/firewall 7 is at a location X as indicated in FIG. 1.

FIG. 1 also depicts a second router/firewall 14 at a second location Y, being connected to a VOIP intercom/phone 10 that typically is associated with a door or gate to a building. Other building operations systems 11 are depicted that are commonly found in large buildings. FIG. 1 further depicts IP camera(s) 12, also typically found in large buildings, and are now even found in smaller buildings. A video Recorder/NVR/DVR 13 is shown, also typically found in buildings associated with their security cameras. A router/firewall 7 is provided in FIG. 1, which is of a type typically found with IP equipment. The router/firewall 14 is connected to a server application 15 via WAN, LAN or internet, for example, and can include other communications which would be known to any one having skill in this art. The element 8 of FIG. 1 corresponds to the element 1, for example.

The elements 8-13 thereby depicts a second portal system with the second IP Router/firewall system 14 attached to the server application 15.

Figure 2:
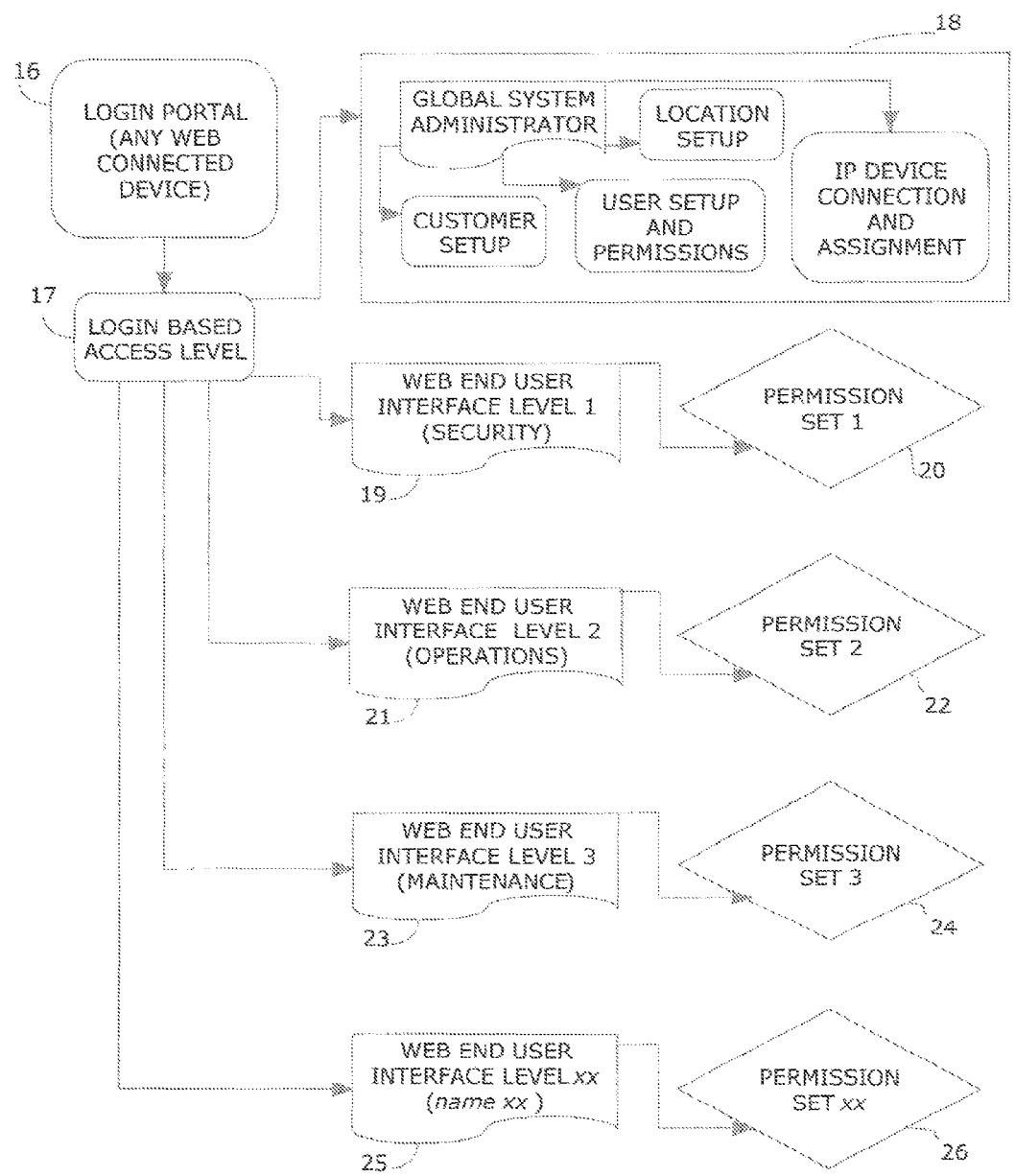
FIG. 2 and FIG. 3 depict the primary components of a server based application, according to the present invention.
Figure 3:
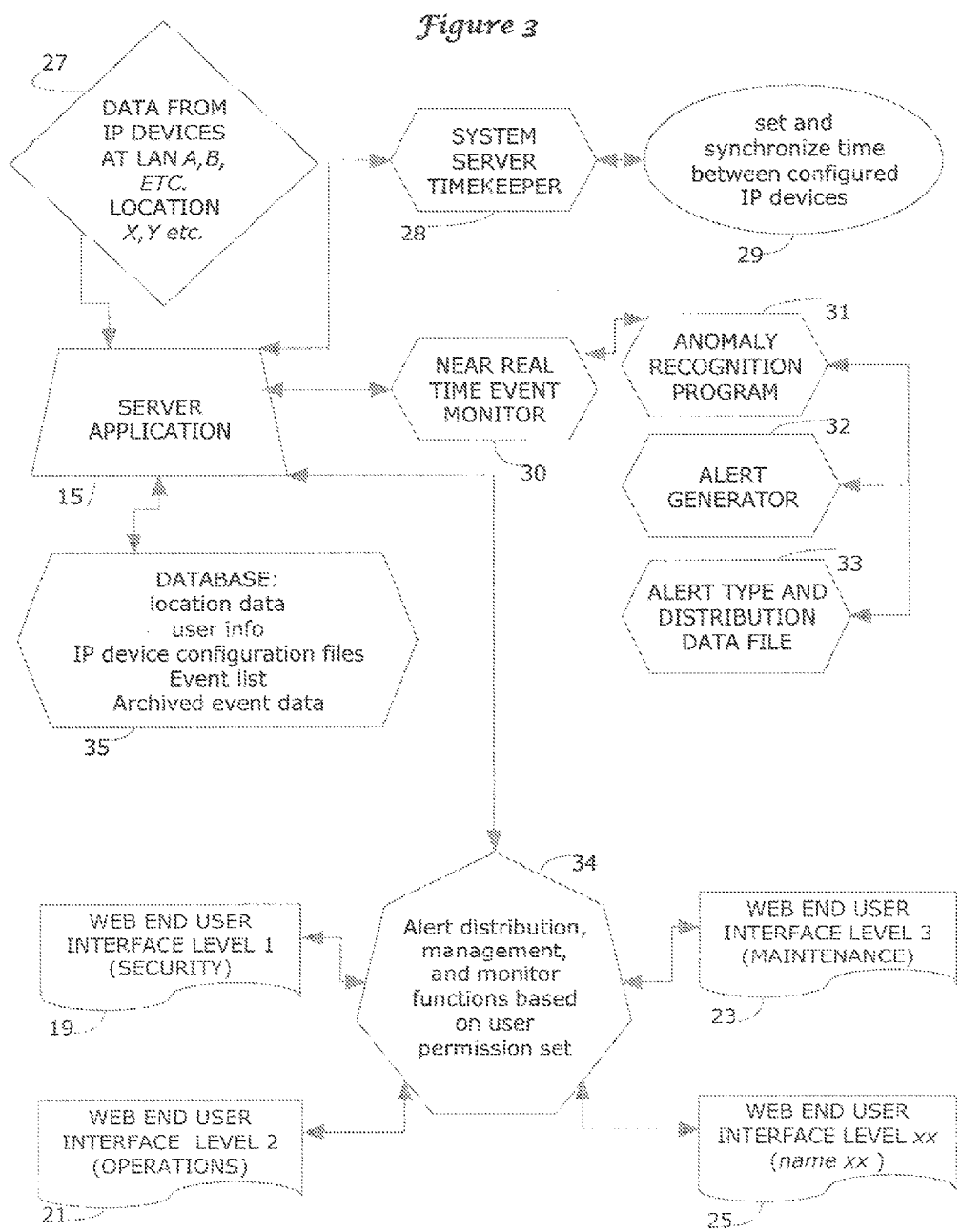

FIG. 2 and FIG. 3 depict the primary components of a server based application, corresponding to the server application 15 of FIG. 1.

In FIG. 2, a login Portal 16 is shown, which can be for any web connected device for example, typically a PC, Smartphone, Tablet, laptop, Pad, and so on. Element 17 depicts a program kernel that controls the access level granted to the person logging in. Element 18 depicts the typical activities of the global system administrator such as user setup, customer setup, permissions, and IP device connection and assignment.

Element 19 depicts the access allowed to end user level 1, and element 20 depicts the permission set of activities granted to level 1 personnel (e.g., security personnel in this instance). Element 21 depicts the access allowed to end user level 2 (operations). Element 22 depicts the permission set granted to level 2 personnel (operations personnel).

Element 23 depicts the access allowed to end user level 3, and element 24 depicts the permission set granted to level 3 personnel (maintenance personnel). Element 25 depicts the access level granted to other levels, here arbitrarily denoted as level xx (for personnel arbitrarily denoted xx). Element 26 depicts the permission set granted to the (arbitrarily denoted) level xx personnel.

In FIG. 3, element 27 depicts data from an IP device at the LAN A, B, etc., location from the location X, Y etc. Element 28 depicts a system server timekeeper that keeps accurate time. Element 29 depicts a program kernel that sets and synchronizes a common accurate time between the configured IP devices system wide. Element 15 is the server application of FIG. 1.

Element 30 depicts a server program kernel that examines the events that arrive from an event generator(s). Element 31 depicts a server program kernel that recognizes anomaly events from standard events. Element 32 depicts a server program kernel that generates the defined alert notifications to defined users. Element 33 depicts the program kernel that manages the data file of alerts sent by type and to whom, and also when. Element 34 depicts a program kernel that checks the permission set granted to users before sending push notifications or event alerts.

Elements 19, 21, 23, and 25 depict the web end users (also referenced in FIG. 2), in communication with the above-noted element 34. Element 35 depicts server based system database files including, but not limited to, customer data, location data, user information, IP device configuration files, event list(s), and archived event data from networked IP devices.

Figure 4:
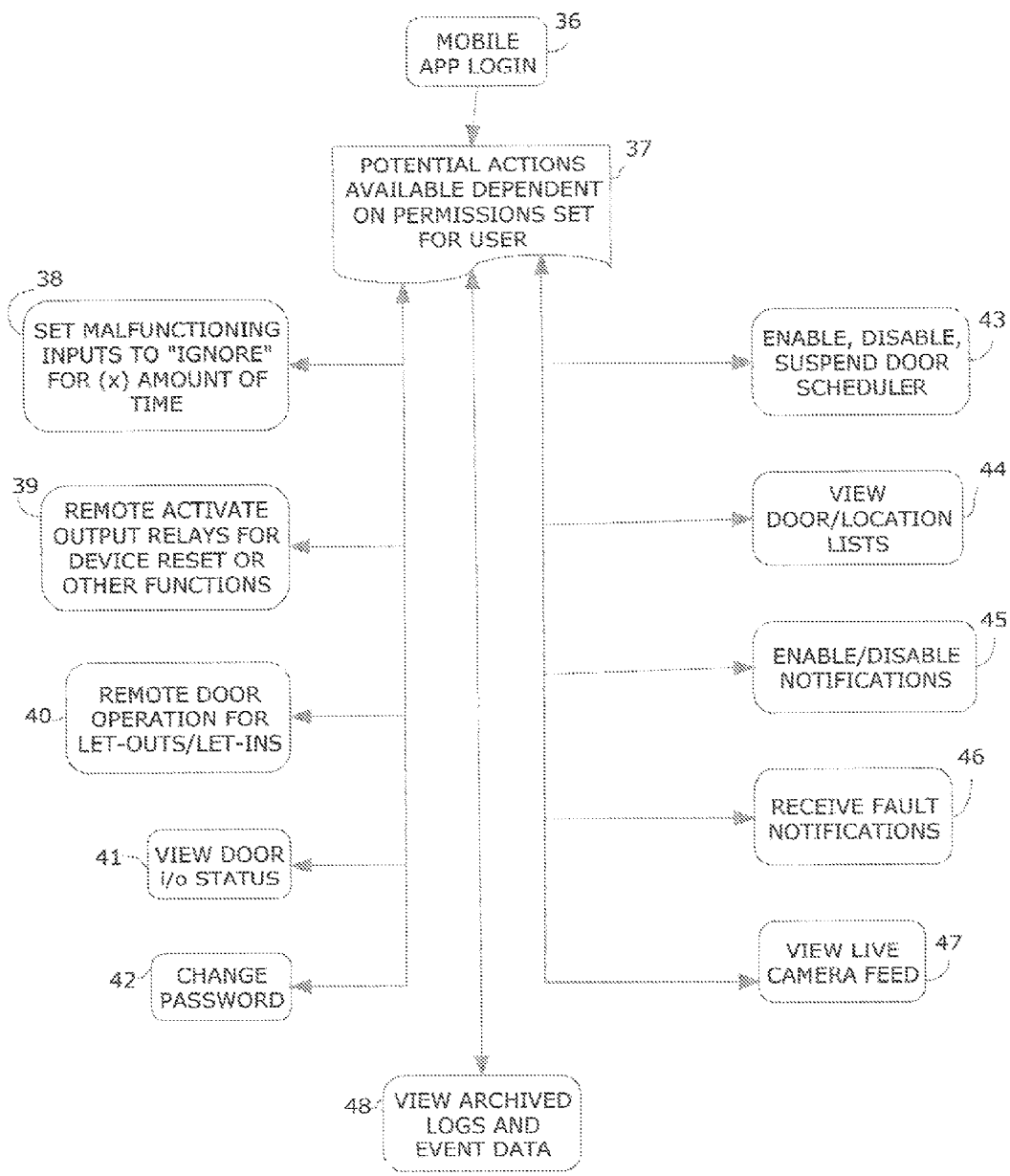
FIG. 4 depicts the program kernels of a mobile APP.

FIG. 4 depicts the program kernels of a mobile APP. The functions could also be available by login from a PC. Element 36 depicts a mobile APP login. Element 37 depicts the subset of the set of potential actions available to any user based on the particulars user's permission set. Element 38 depicts a program kernel that allows the user to instruct the door/gate controller (element 2 of FIG. 1) to null or ignore active inputs (element 1 of FIG. 1) for a defined length of time.

Element 39 of FIG. 4 depicts a program kernel that allows the user to activate output relays controlled by IP device (element 2 of FIG. 1) for device reset (element 1 of FIG. 1) or to initiate other functions actuated by the relays. Element 40 depicts a program kernel that allows remote door/gate/equipment operation, with let-in/out operation and with a log kept of activity by "who" and "when" on the server database 35 of FIG. 3.

Element 41 depicts a program kernel that allows the user to view door/gate/equipment i/o status by location/door/gate/equipment IP controller (element 1 of FIG. 1). Element 42 depicts a program kernel that allows the user to change his/her password. Element 43 depicts a program kernel that allows the user to enable, disable or suspend the door scheduler that determines time periods the door/gate/equipment remains open or on. Element 44 depicts a program kernel that allows the user to view the locations and door/gate/equipment lists that his/her permission allows. Element 45 depicts a program kernel that allows the user to enable and disable system generated push notifications. Element 46 depicts a program kernel that allows the user to receive door/gate/equipment system fault notifications. Element 47 depicts a program kernel that allows the user to view live camera feed. Element 48 depicts a program kernel that allows the user to access location/door/gate/equipment archived log files and event data.

Figure 5:
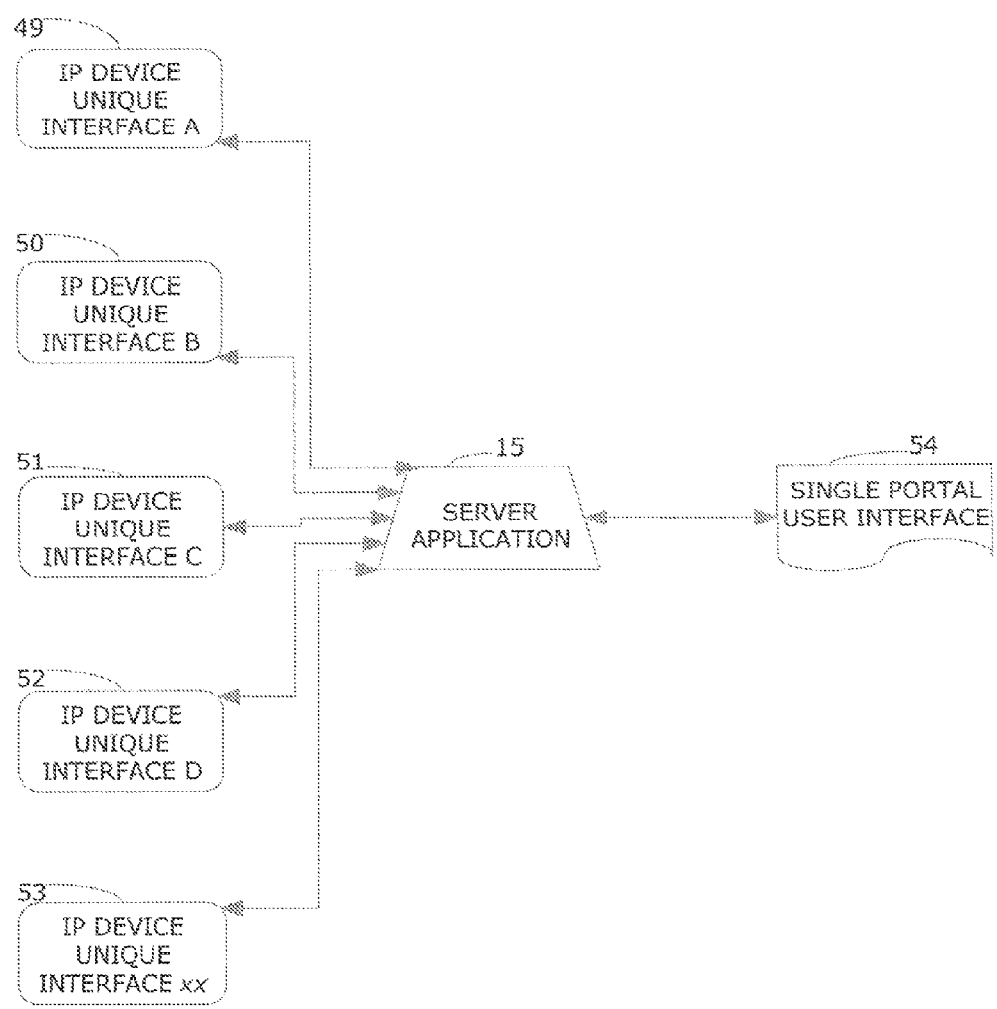
FIG. 5 depicts multiple unique interfaces connectable with the server application, and a single portal user interface with credential login.

FIG. 5 depicts multiple unique interfaces connectable with the server application, and a single portal user interface with credential login. Element 49 depicts an IP device with a unique interface A. Element 50 depicts an IP device with a unique interface B. Element 51 depicts an IP device with a unique interface C. Element 52 depicts an IP device with a unique interface D. Element 53 depicts an IP device with unique interface arbitrarily denoted xx (wherein xx refers to an arbitrary number of devices). Element 54 depicts a single login point, whether on a PC, mobile web, laptop, mobile app, smart-phone or tablet device.

Referring to the drawings in which the numerals represent the principal hardware and software kernels and components of the system with the arrows representing signal and data pathways on FIG. 1 and user access pathways to software activities, functions and information in FIGS. 2 and 3. The IP Door, IP door/gate and IP door/gate/equipment all refer to meaning all IP equipment controllers including doors and gates and other equipment.

Each signal generated by a door control device 1 has the processor in the IP door/gate/equipment controller and application 2 that creates a time stamped named event that is logged into the door controller system memory. Simultaneously, the IP cameras 5, 10 are also generating time stamped camera images and saving them in the IP video recorder/NVR/DVR 5, 12 respectively.

The door/gate/equipment controller program sifts the data generated and sends specific defined data to the server application 16. The server application 15 then based on defined parameters in its program grabs specific imagery from the IP Video recorder 6 generated by IP cameras 5, 12 for archiving in server memory data files 35, forwarding to group(s) defined in user setup and permissions 18 or for creating a searchable server based log 35 accessible by system operators via login 17. If an intercom 3, 10 and credential system are included in the system the searchable combined database expands to include data and named events from these devices. This system allows the system operator to search throughout the networked system for specific named events by person, by when, by type, by building, by portal, by door/gate/equipment by IP device across multiple openings at various locations or properties owned or managed by the customer. Additionally, operating personnel can be allowed permission to perform defined event types as allowed, not allowed, alerted and not alerted if certain events occur depending on criteria such as time of day or other defined criteria so that critical management decisions and actions are taken or not taken because of defined criteria, at defined times by operations, security and maintenance personnel and or specified run activity at designated/portal/door/entrance/exit/equipment.

Example 1

Suppose one were a garage operator and wanted to see all the vehicle door impacts. With the allowed permission that operator could search system wide for safety edge activations and/or overload tripped as this signal and named event commonly occurs when cars hit doors. By viewing and investigating each incident systems can be designed to avoid impacts and the associated costs. In addition, the images can easily be found among the otherwise mass of collected imagery because the search of imagery can be narrowed to specific and otherwise rare signal events that only occur during door/vehicle impacts. This information might be assigned as permission access to maintenance and management decision makers.

Example 2

A door has a sound operated access device connected to the open command input. The fault observed is that the door randomly reopens when it reaches the closed position from the open position rather than staying closed. The situation is so random that the fault cannot be duplicated in testing. Inspection of the door controls and parts reveal nothing amiss. Hours of video have to be searched even to see the event as it was reported.

With the system described herein, a search can be made of open events that do not have a corresponding activation of the safety loop device (indicating door opened, but no vehicle passed through). The video clip attached to these specifically narrowed events can be viewed to assure no vehicle or pedestrian passed, and that the sound operated access device was activated with no valid reason. It is determined that noise generated by the door hitting the floor occasionally triggered the sound activated opening device that produced a random signal to reopen the door.

Example 3

Suppose one were an operations manager and wanted a door to close that was being held open by its time clock scheduler. The operations manager would simply log on to the server, choose the location and then door and access its scheduler program changing its run parameter as desired. In an alternate embodiment, the scheduler program would be built or modified in the server application and then the modified file downloaded to the IP door controller. Or, the choice can be to override the open command for the current period only and not change the schedule as a whole.

These examples are indicative of the possibilities the system offers and in no way restricts the number of possibilities the system creates.

FIG. 1 shows an example of two separate LAN networks with IP connected equipment, signal and input devices 1, 8, comprising at least one input device per LAN, are connected to an IP door controller and event generator 2, 9 (with or without credential access system incorporated), which sends time stamped named events through Router/Firewall A, B 7, 14 to the server application 15 in FIGS. 1 and 3. These events are defined during setup 18 from signals sourced by a single signal from element 1 devices or by the controller 2 program from a specified combination of signals from connected devices.

Also, VOIP intercoms 3, 10, IP Cameras 5, 12, IP Video recorder/NVR/DVR 6, 13, and other future IP devices 5, 11 can optionally be added to the system to increase the searchable data fed to the Server Application 15 for event analysis and added operational capabilities.

FIG. 2 depicts the organizational system and software kernels for applying different access and permission levels to different users. This capability is well understood by software writers skilled in the art. In this preferred embodiment, a user would connect to the Login Portal 16 from any internet connected PC browser, tablet, smartphone, or through a mobile app (FIG. 4). A User enters login information which is compared (FIG. 2, element 17) to information in the Database 35 to determine which permissions (FIG. 2, elements 20, 22, 24, and 26) are to applied to that user. That user then only has access to data as allowed by the permission previously set by the Global System Administrator (FIG. 2, element 18).

In this embodiment, the application sorts the users into user groups typically associated with building operations personnel generally described as security operators (FIG. 2, element 19), operations managers typically building or parking garage managers (FIG. 2, element 21) and maintenance personnel (FIG. 2, element 23). Other user groups can be defined (FIG. 2 element 25). The permission set granted to the user group (FIG. 2 elements 20, 22, 24, 26) would define the data set and operating decisions available to the user group. Alternately, there could be just one user group or many.

For Example: in one embodiment, an operations user would connect to the Login Portal (FIG. 2 element 16) from any internet connected PC browser, tablet, smartphone, or through a mobile app (FIG. 4). The User enters login information which is compared (FIG. 2 element 17) to information in the Database (FIG. 3 element 35) to determine which permissions (FIG. 2 elements 20, 22, 24, 26) are to applied to that user. That user then only has access to data as allowed by the permission previously set by the Global System Administrator (FIG. 2 element 18). He/she might have permission to remotely operate the door connected to (FIG. 1) LAN A at location X but not LAN B at location Y. He/she would not necessarily have access to security and maintenance portions of the program for that or other locations unless specified at setup. Alternately, the maintenance user group might have access to data typically require by maintenance personnel such as operation logs, fault logs, error logs, door controller set up and use records (cycle counts).

FIG. 3 depicts the main server application program kernels that serve to create the system server application functionality. The system server timekeeper (FIG. 3 element 28) serves the vital function of keeping all IP devices in synch. This ensures each event generating device's events are connected in the Database (FIG. 3 element 35) with the synchronized time stamps as they occur. The event data from connected devices (FIG. 3 element 27) is parsed in the Server Application (FIG. 3 element 15) and Near Real Time Event Monitor (FIG. 3 element 30) functions according to the rules set by the System Admin (FIG. 2 element 18) to determine if a fault has occurred determined by the anomaly recognizer (FIG. 3 element 31). The Alert Generator (FIG. 3 element 32) pulls predetermined alert messages from kernel (FIG. 3 element 33) and sends them out according to rules in the kernel (FIG. 3 element 34) at times determined by kernel (FIG. 2 element 28). The alert message is logged in system Database (FIG. 3 element 35) and propagated via electronic message, (e.g. SMS or text message, email, or push notification) to the email recipient Mobile App (FIG. 4).

Importantly, the Database (FIG. 3 element 35) and Server Application (FIG. 3 element 15) provide the users (FIG. 3 elements 19, 21, 23, 25) through a browser interface or Mobile App (FIG. 4), access to events, log files, archived data, credential management, camera live viewing, diagnostic information, remote operation, fault status, 365 day operation schedule management, VOIP intercom communication, and potentially other building equipment management functions with a single login point.

FIG. 4 details typical actions available to operating personnel users through a Mobile App or login (FIG. 2 element 16). Depending on permissions set for the user (FIG. 4 element 37) the master data set and operational capability is available to the user in different formats. A mobile APP is a more convenient way to login to the server and use the system (FIG. 2 element 6). Typically, the presentation via a PC is different than that of mobile APP. However, the functional capability of the system can remain unchanged. The view door controller status (FIG. 4 element 41) allows a user to see any active devices connected that may be causing a fault in the equipment operation. In current systems, this information can only be determined by onsite service company technicians.

The Kernel (FIG. 4 element 38) then allows user has the ability to set malfunctioning inputs to "ignore" or "null" for (x) amount of time which allows a user to nullify a faulty input such as a damaged key switch that will not allow the door to close for the night. Current systems do not monitor specific inputs; the damaged or lost key scenarios currently requires someone to notice the open door, to call the manager or persons in charge of the door, for that person to verify door is stuck open, for that person to then call a 24 hour service company, for that company to respond to the site. Several hours typically pass before a resolution is made, costing time, money, and security vulnerability. In the full embodiment of the system described, the key switch designated input, monitored by the Event Generator (FIG. 1-2,9), being active outside the hours defined by the Administrator (FIG. 2 element 18) in conjunction with system timekeeper (FIG. 3 element 28) sends an alert message to the user who can then set the key input to "ignore" or "null" for 12 (or XX hours). The active key switch input is "removed" by software instead to by its disconnection by the service technician. The user can then call the service company out during normal business hours to effect repairs. In a preferred embodiment, the service company is automatically notified via e-mail, text message, etc. that a fault has occurred and the offending switch signal has been nulled. This allows the door to operate normally minutes after the failure, without the time, security and monetary losses experienced by current systems. Additionally, the service tech knows the issue is a faulty switch and he can be sure to have one available when he arrives saving time, money and hassle to the facility manager/owner. Also importantly, and a specific feature of this system, the system timekeeper can automatically remove the null setting after a defined time period so that malfunctioning equipment is not rendered into a permanent altered state and the issue reengages the attention of the facility manager to have the malfunctioning equipment fully repaired.

Not every device signal (FIG. 1 element 1) can safely be nulled to achieve operational status. However, doors typically have redundant control systems where operation can be maintained with one or more control devices deactivated or nulled.

Another unique feature of this embodiment:

Magnetic loop detectors are a common device used to protect and control gates and doors that can lock into a fault condition and remain active, preventing a door or gate from closing. By activating an output relay remotely (FIG. 4 element 39), detector power routed through the relay can be cycled off and on which serves to reset the detector, again saving the costs and time of an emergency service call as the service tech would likely also just reset the detector manually unplugging it and then plugging it back in or hitting its reset button which also cycles its power. The event is logged as a fault. System parameters determine whether the event merits notifications to be sent. A flag can be set in the server data base to effect notification(s) only if a fault appears x number of times over a defined period or to omit to send faults that are regenerated as duplicated or outside specified hours. To save processor resources and memory, sequentially generated and detected faults can be scrubbed or ignored by the system program parameters set in event generator (FIG. 3 element 32).

With the integrated camera viewing (FIG. 1 element 5), remote let ins or outs (FIG. 4 element 40) can more safely and securely be performed, logged, and stored as events for later audit or review. They can be performed without a camera view, however. Although cameras tied to door release and activation mechanisms are common in the security industry, the unique capability to review video by a named event generator by devices typically associated with motorized doors allows the system operators to set up unique search criteria that allows the user to find the footage he is interested in more quickly, or even have the critical image data automatically arrive attached to an alert message generated by the anomaly recognition kernel (FIG. 3 elements 31, 32 and 33) to initiate remedial action in real time.

If the optional 365 door scheduler software kernel is included in the system, (FIG. 4 element 43) the user can temporarily or permanently suspend operation, or change time and holiday settings, remotely, which hold the door open at scheduled intervals.

Scheduler Kernel:

An integrated scheduler (traditionally a separate time-clock that only allows for programmed "open" intervals is displayed by kernel (FIG. 3 element 28). Fault and security notifications generated by the system can be sent or not also depending on the scheduler. Additionally, run parameters such as the time delay before closing can also be changed based on the scheduler settings. The door might remain open for 15 seconds after a vehicle exits during the day and closed immediately after a vehicles passes the safety eye or loop at night "security hours" to increase security. In the preferred embodiment, the scheduler would have different timer settings and allow different system parameters to be conducted during defined security hours vs. standard hours. The user has many options to change, override or alter the door run and system notification parameters based on the integrated scheduler capabilities for days of week, holiday, weekend, and time of day criteria being typical.

Other typical management features such change password (FIG. 4 element 42), view live camera feed, (FIG. 4 element 47) or forward video or event data to interested other parties not part of the defined user groups all fall within the systems unique capabilities.

For instance: The event log file and the image data of a door hit incident can be sent to an insurance company as evidence in a damage claim at the moment it is viewed by the operations manager. Or, the intruder video and event data can be forwarded to police if a crime has been committed within seconds of the event.

The video of the vehicle hitting the door and activation the safety edge is synchronized such that a search on safety edge activations actually includes time relevant images, not images 3 seconds later when the vehicle is no longer present or the license plate is no longer in the image. The synchronization managed by the system time keeper of the various IP devices networked into the system is a critical component that allows operational functionality of the individual IP devices to operate effectively in the integrated system.

Additionally, with system synchronization, the Server Application (FIG. 3 element 15) can pull image data prior to and after any named events generated by event generators (FIGS. 1-3, 9) that have associated cameras (FIGS. 1-5, element 12). For instance, this feature allows the vehicle to be seen in the event image data prior to and after it actually strikes the safety edge. Or, somebody walks up to the push button, walking up to the manual chain, etc. In this way, the video image data is more likely to include data relevant to the investigation such as readable license plate information as the vehicle moves into and out of camera range, usable person recognition image data, for the same reason, etc. as persons operationally skilled in the art of accident and crime event investigation, camera technicians and system fault diagnosticians would understand. And also importantly for the system operators, because only defined specific image data is sent to the server, data transmitting systems are less likely to be overloaded.

As seen in FIG. 5, two key functions of a portal equipment management system by necessity would be a software kernel that would manage the system users and managers as well as the connection of the individual IP devices to the server. FIG. 5 depicts the individual IP devices (elements 49, 50, 51, 52, 53), the server application 15 and the user interface 54. Although many configurations are possible, if a single server were to handle multiple facilities, a user setup would include designation of which devices in which facility and what data generated would a specific user be authorized to view and what operations would he be allowed to perform. As a practical matter a preferred embodiment may be as follows:

In the FIG. 5, the IP device A-XX has a unique identifier such as a Mac address or serial number or other unique identifier on the network, which is entered into the server database by a Global Administrator (FIG. 2 element 18) and when sold to customers are assigned to a specific customer or user group. The IP device may have a kernel of code that is activated when the device is powered up and is connected to the internet. The kernel can make the device a "plug and play" device. If it doesn't, the system administrator has to set up the device manually, but in either case the setup is by the system device manager be it electronic or human in nature. The device in essence announces to the server "hello here I am". The server can talk to the device according to the rules of its program, which may include data collection, configuration of the device, automatic login by the server program, and other functions as needed and available on a particular device. Then the global device system administrator, the device having "connected" itself to the system, can be assigned to a "customer" who when seeing the device in their database uses his access credential to assign system access to users of the device and the data it generates in "his" portion of the system. In this way the end user enjoys controlled access also and controlled use of the system without needing the specialized knowledge required to set up all the disparate devices, nor the need to memorize several different login and management procedures for each of the connected devices.

The invention being thus described, it will be evident that the same may be varied in many ways by a routineer in the applicable arts. Such variations are not to be regarded as a departure from the spirit and scope of the invention and all such modifications are intended to be included within the scope of the claims.

What is claimed is:

1. An intelligent facility management system for allowing a user to access and organize the capabilities of multiple system connected IP devices through a single login portal, comprising:
   a computer;
   a searchable database in communication with said computer;
   a server application in communication with said database;
   a plurality of sensors which have respective output signals;
   a controller having a controller program; said controller having a plurality of inputs, said controller being in communication with said plurality of sensors; wherein said plurality of inputs are supplied by said plurality of sensors which have said respective output signals;
   an event generator as a component of said controller generating events in response to said output signals, said event generator being in communication with said database; and
   an access management means in communication with said server application and with said database, for controlling access to said server application, for supplying event information to said database and for controlling access to said database;
   said plurality of sensors being in communication with said controller and in communication with said database, such that said computer in communication with said controller can alter a response of said controller response to said respective output signals of said sensors for a defined period of time from a remote location, where said defined time period is either predetermined by said server application or by an end user through said computer; and wherein after expiration of said defined time period said controller will revert said response of said controller to a prior controller response state.

2. A system as claimed in claim 1, further comprising:
   an alert means in communication with said database, using said event generator output to build an event library stored in said database which can be used to generate alerts and compile reports.

3. A system as claimed in claim 1, further comprising:
   an alert means in communication with said database, using said event generator output to build an event library stored in said database which can be used to generate alerts and compile reports where said alert can be sent in the form of any of an e-mail, text message, SMS, push notifications, and computer generated voice message.

4. A system as claimed in claim 1, further comprising:
   an alert means in communication with said database, using said event generator output; to
   build an event library stored in said database which can be used to generate alerts and compile reports where said alert can be sent in the form of any of an e-mail, text message, SMS, push notification, computer generated voice message, and other forms of electronic communication whereby receipt of said alert can be confirmed and logged into said database.

5. A system as claimed in claim 1, further comprising:
   an IP video camera connected to said server application and said database where video data is timestamped and connected in said database with events generated by said event generator, with said video data becoming part of the said event library and said database.

6. A system as claimed in claim 1, further comprising:
   an IP video camera connected to said server application and said database where video data is timestamped and connected in said database with events generated by said event generator, with said video data becoming part of the said event library and said database, where said video duration can be determined by said server application, including a start time prior to initiating event and after event completion as determined by said event generator.

7. A system as claimed in claim 1, where said timestamped video data, associated with said events, and stored on local IP video recorder/NVR/DVR, can further be recalled by said server application to include said video data from before and/or after said event.

8. A system as claimed in claim 1, where said timestamped video data, associated with said events, and stored on local IP video recorder/NVR/DVR, can further be recalled by said server application to include said video data from before and/or after said event, where said video data recorded before and/or after said event can be determined by said server application and/or end user.

9. A system as claimed in claim 1, wherein said event library includes user data from controlled access user database either from an access control system internal to said controller, or with external third party IP based access control database integration.

10. A system as claimed in claim 1, where said event library and said database include timestamped data from a VoIP intercom system.

11. A system as claimed in claim 1, wherein said computer in communication with said controller can alter the function of individual sensors and negate the influence any of said individual sensors has on said controller program.

12. A system as claimed in claim 1, wherein said computer in communication with said controller can alter the function of any of said individual sensors either temporarily or permanently from a remote location.

13. A system according to claim 1 where said server application includes managed access to internal web based controller setup and configuration areas directly from said server application login.

14. A system according to claim 1 wherein said server application includes managed access to internal web based camera setup and configuration areas directly from said server application login.

15. A system according to claim 1 where said server application includes managed access to internal web based VoIP setup and configuration areas directly from said server application login.

* * * * *